(12) United States Patent
Fukunaga

(10) Patent No.: US 8,452,104 B2
(45) Date of Patent: May 28, 2013

(54) IMAGE DETERMINATION APPARATUS, COMPUTER READABLE MEDIUM STORING PROGRAM, AND METHOD

(75) Inventor: Masakazu Fukunaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 286 days.

(21) Appl. No.: 13/038,092

(22) Filed: Mar. 1, 2011

(65) Prior Publication Data

US 2012/0033889 A1  Feb. 9, 2012

(30) Foreign Application Priority Data

Aug. 9, 2010  (JP) .................................. 2010-178891

(51) Int. Cl.
*G06K 9/46*  (2006.01)

(52) U.S. Cl.
USPC ........... 382/190; 382/182; 382/181; 382/195; 382/218; 382/282; 382/305; 382/254; 382/275; 358/464; 358/403

(58) Field of Classification Search
USPC ................. 382/190, 182, 181, 195, 218, 282, 382/305, 254, 275; 358/464, 403
See application file for complete search history.

(56) References Cited

U.S. PATENT DOCUMENTS

| 5,790,701 | A | * | 8/1998 | Shijo et al. | 382/205 |
| 7,133,558 | B1 | | 11/2006 | Ohara et al. | |
| 7,948,664 | B2 | * | 5/2011 | Morimoto et al. | 358/474 |

FOREIGN PATENT DOCUMENTS

| JP | A-02-210586 | 8/1990 |
| JP | A-2007-213255 | 8/2007 |

* cited by examiner

*Primary Examiner* — Mike Rahmjoo
(74) *Attorney, Agent, or Firm* — Oliff & Berridge, PLC

(57) ABSTRACT

An image determination apparatus includes a first extraction unit, a second extraction unit, a calculation unit, and a correction unit. The first extraction unit extracts a first set from an image including linear components that are line-shaped components. The first set includes a linear component extending along a first direction and a linear component extending along a second direction intersecting the first direction. The second extraction unit extracts a second set including a linear component extending along a direction different from the first and second directions. The calculation unit calculates a likelihood for the first set extracted by the first extraction unit in accordance with a relationship between linear components included in the first set. The likelihood is a likelihood of a table being formed. The correction unit corrects the likelihood calculated by the calculation unit in accordance with a relationship between the first set and the second set.

19 Claims, 13 Drawing Sheets

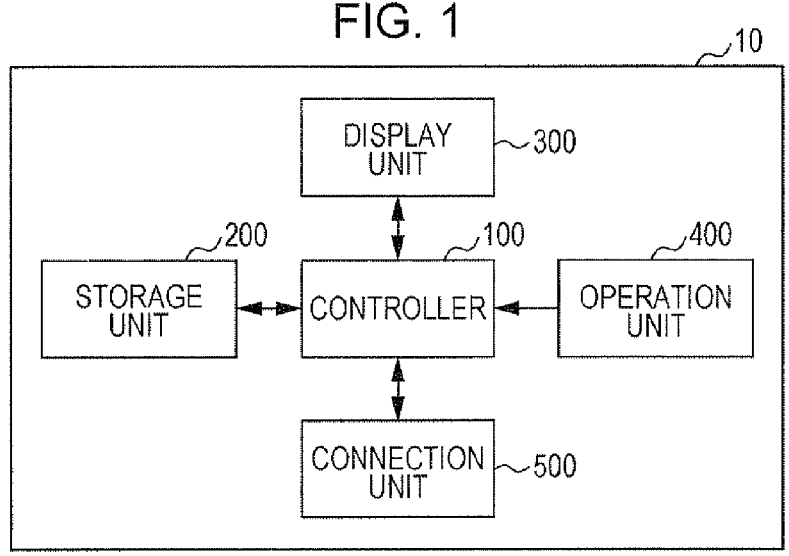
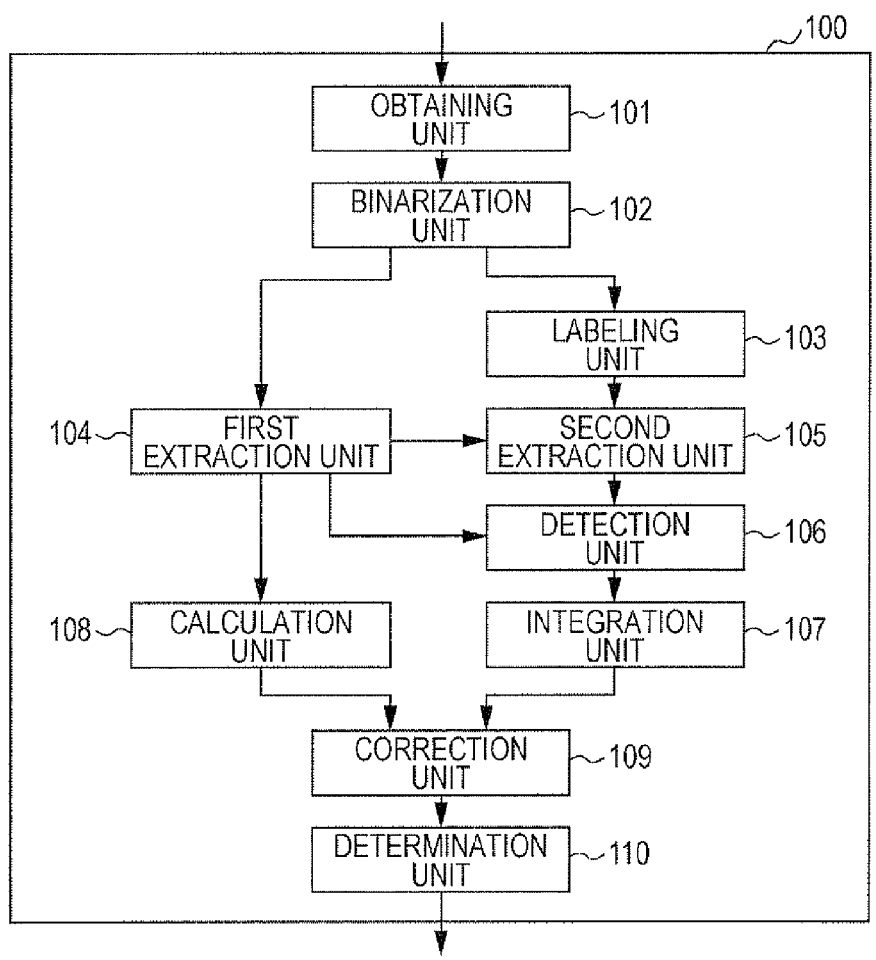

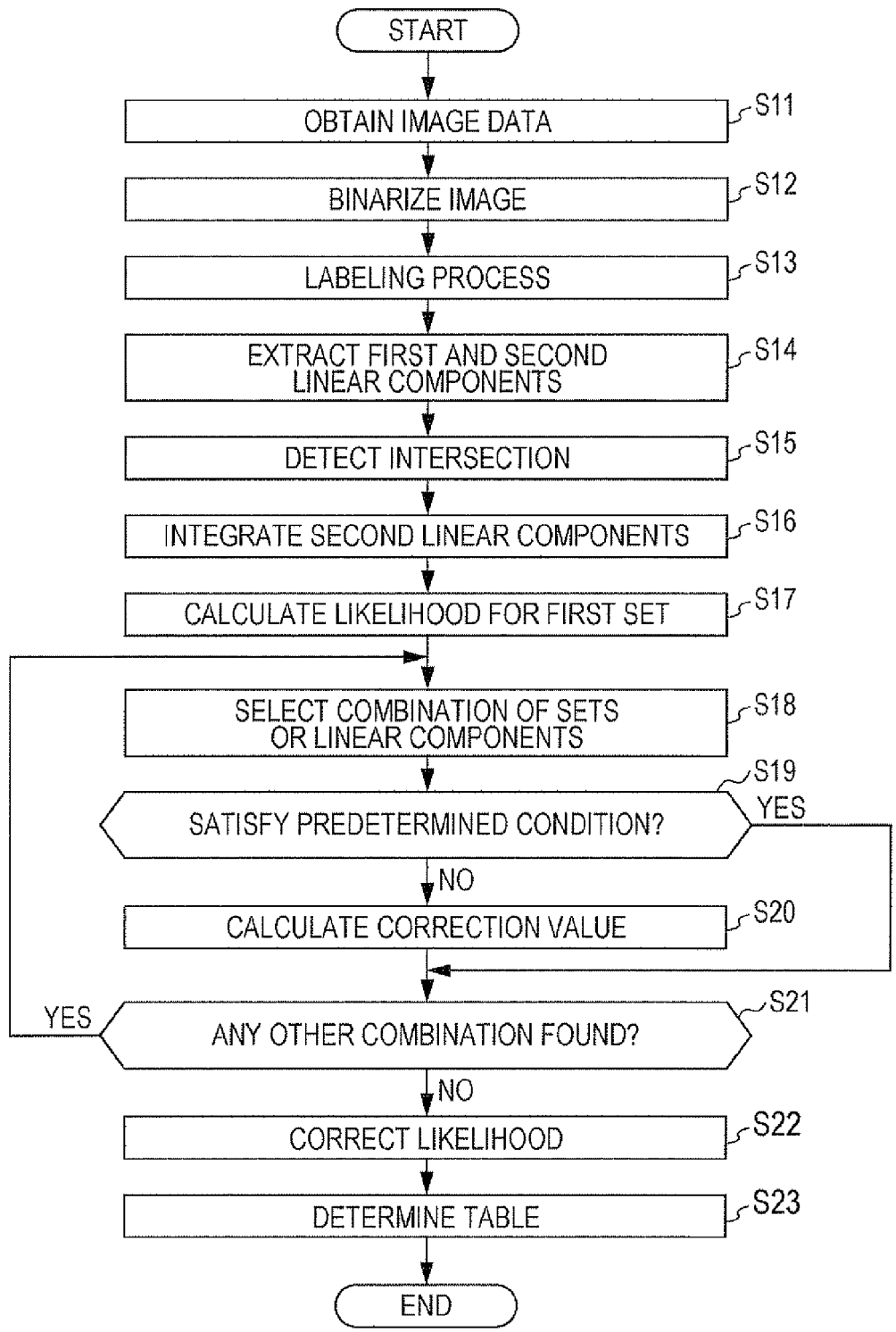

IMAGE DETERMINATION APPARATUS, COMPUTER READABLE MEDIUM STORING PROGRAM, AND METHOD

CROSS-REFERENCE TO RELATED APPLICATIONS

This application is based on and claims priority under 35 USC 119 from Japanese Patent Application No. 2010-178891 filed Aug. 9, 2010.

BACKGROUND (i) Technical Field

The present invention relates to an image determination apparatus, a computer readable medium storing program, and a method.

(ii) Related Art

Techniques for extracting a table from an image have been available.

SUMMARY

According to an aspect of the invention, there is provided an image determination apparatus including a first extraction unit, a second extraction unit, a calculation unit, and a correction unit. The first extraction unit extracts a first set from an image including linear components that are line-shaped components. The first set includes a linear component extending along a first direction and a linear component extending along a second direction intersecting the first direction. The second extraction unit extracts a second set including a linear component extending along a direction different from the first direction and the second direction. The calculation unit calculates a likelihood for the first set extracted by the first extraction unit in accordance with a relationship between linear components included in the first set. The likelihood is a likelihood of a table being formed. The correction unit corrects the likelihood calculated by the calculation unit in accordance with a relationship between the first set and the second set.

BRIEF DESCRIPTION OF THE DRAWINGS

Exemplary embodiment(s) of the present invention will be described in detail based on the following figures, wherein:

FIG. 1 is a block diagram illustrating the hardware configuration of an information processing apparatus;

FIG. 2 is a block diagram illustrating the functional configuration of a controller;

FIG. 3 is a flowchart illustrating a process in which a controller determines a table from image data;

FIGS. 6A and 68 illustrate an example of second linear components extracted from the image;

DETAILED DESCRIPTION

Exemplary Embodiment

Figure 4:
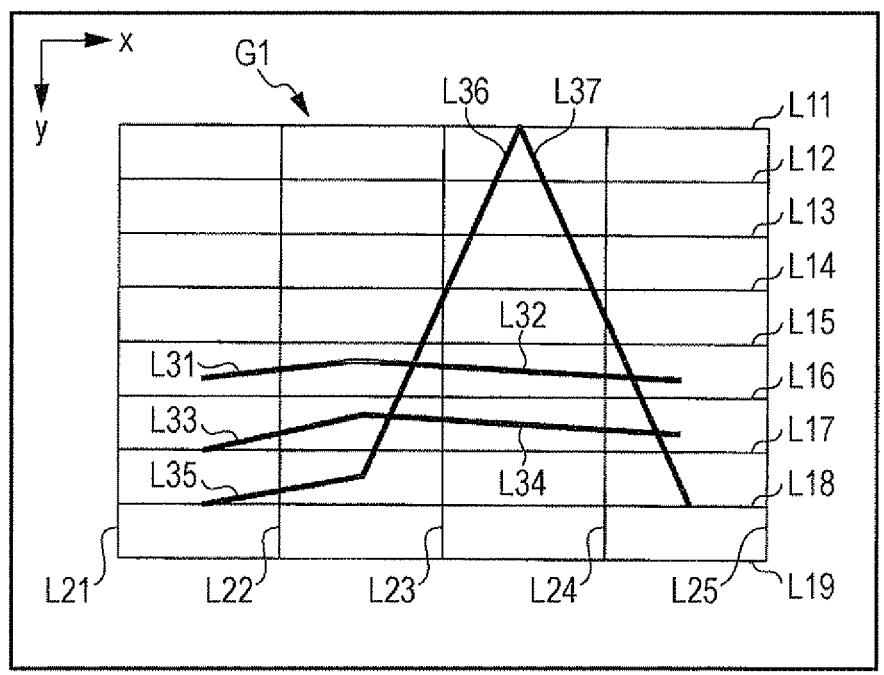
FIG. 4 illustrates an example of an image including linear components.

FIG. 1 is a block diagram illustrating the hardware configuration of an information processing apparatus 10 according to an exemplary embodiment of the present invention. The information processing apparatus 10 includes a storage unit 200, a display unit 300, an operation unit 400, a connection unit 500, and a controller 100. The controller 100 includes an arithmetic unit such as a central processing unit (CPU) and a storage device such as a memory, and controls the operation of the individual units of the information processing apparatus 10. The storage unit 200 may be a memory such as a non-volatile memory, and stores image data and the like supplied from the controller 100, which will be described below. The display unit 300 includes, for example, a liquid crystal display as a display device configured to display an image, and displays a screen for allowing the user to operate the information processing apparatus 10, various messages, and the like under the control of the controller 100. The operation unit 400 may be an operation device such as a touch screen or buttons for allowing the user to perform various operations of the information processing apparatus 10, and supplies information indicating the operations to the controller 100. The connection unit 500 is connected to external devices including a reader (such as a scanner) and an imaging device (such as a digital camera), and receives image data output from the external devices. The connection unit 500 supplies the received image data to the controller 100.

FIG. 2 is a block diagram illustrating the functional configuration of the controller 100 of the information processing apparatus 10. The controller 100 executes a program to implement functions corresponding to an obtaining unit 101, a binarization unit 102, a labeling unit 103, a first extraction unit 104, a second extraction unit 105, a detection unit 106, an integration unit 107, a calculation unit 108, a correction unit 109, and a determination unit 110 which are illustrated in FIG. 2. Therefore, the controller 100 implements a function for specifying a table from image data. The controller 100 implements the functions of the individual units illustrated in FIG. 2 to realize functions of an example of an "image determination apparatus" according to an exemplary embodiment of the present invention.

The obtaining unit 101 obtains image data supplied from the connection unit 500. Here, the image data may be data upon which an image represented by plural pixels is based. The image data includes tone values of respective pixels and values indicating the positions at which the pixels are displayed. The obtaining unit 101 supplies the obtained image data to the binarization unit 102.

The binarization unit 102 binarizes the image represented by the image data supplied from the obtaining unit 101. In this exemplary embodiment, the binarization unit 102 may binarize the image into white pixels and black pixels and set the black pixels as non-background pixels and the white pixels as background pixels. The binarization unit 102 may perform the image binarization process using a known technique. The binarization unit 102 supplies data indicating the positions of the black pixels to the labeling unit 103 and the first extraction unit 104.

The labeling unit 103 performs a labeling process for assigning a common label to concatenated pixels among the black pixels using the data supplied from the binarization unit 102. A pixel group subjected to the labeling process is distinguished from other pixel groups by a label assigned to the pixel group. The labeling unit 103 supplies data indicating the pixel group assigned the label to the second extraction unit 105. The data may be data indicating the correspondence between, for example, values indicating the positions of the individual pixels included in the pixel group and the label assigned to the pixel group. The labeling unit 103 may perform the labeling process using a known technique.

The first extraction unit 104 extracts line-shaped components from the image using the data supplied from the binarization unit 102. The term "line-shaped components", as used herein, refers to image components represented by a linearly concatenated pixel group. Here, a line-shaped component may not necessarily be a line segment in mathematical sense (that is, a part of a straight line), and a component having a certain amount of distortion (including inclination and bend) may be acceptable. For the convenience of description, a line-shaped component is hereinafter referred to as a "linear component", and a linear component extracted by the first extraction unit 104 is hereinafter referred to as a "first linear component".

The first extraction unit 104 extracts a first set including a first linear component in a first direction and a first linear component in a second direction intersecting the first direction. In this exemplary embodiment, the first direction and the second direction may be perpendicular to each other. The first extraction unit 104 may extract the first linear components using a known technique, for example, using the technique disclosed in Japanese Unexamined Patent Application Publication No. 2-210586. The first extraction unit 104 supplies data indicating the extracted first linear components to the second extraction unit 105, the detection unit 106, and the calculation unit 108. The data may be data indicating the correspondence between, for example, a code by which a first linear component is uniquely identified and values indicating the positions of pixels included in the first linear component. The first extraction unit 104 may correspond to an example of a "first extraction unit" according to an exemplary embodiment of the present invention.

The second extraction unit 105 extracts a second set including linear components in a direction different from the first direction and the second direction. For the convenience of description, a linear component extracted by the second extraction unit 105 is hereinafter referred to as a "second linear component". Specifically, the second extraction unit 105 extracts a line-shaped pixel group as linear components from pixel groups that remain after excluding the pixels included in the first linear components from the pixel group labeled by the labeling unit 103 using the data supplied from the first extraction unit 104. The second extraction unit 105 supplies data indicating the extracted second linear components to the detection unit 106. The data may be data indicating the correspondence between, for example, a code by which a second linear component is uniquely identified and values indicating the positions of pixels included in the second linear component. The second extraction unit 105 may correspond to an example of a "second extraction unit" according to an exemplary embodiment of the present invention.

The detection unit 106 detects intersections of the linear components (first linear components) extracted by the first extraction unit 104 and the linear components (second linear components) extracted by the second extraction unit 105. The detection unit 106 detects intersections of linear components from, for example, the values indicating the positions of the pixels included in the individual linear components using the data supplied from the first extraction unit 104 and the second extraction unit 105. The detection unit 106 supplies intersection data indicating the detected intersections to the integration unit 107. The intersection data may be data indicating the correspondence between, for example, a code by which an intersection is uniquely identified and values indicating the positions of pixels included in the intersection. The detection unit 106 may correspond to an example of a "detection unit" according to an exemplary embodiment of the present invention.

The integration unit 107 integrates second linear components that are extracted by the second extraction unit 105 and that intersect each other on the basis of the intersection data supplied from the detection unit 106. The integration unit 107 integrates intersecting second linear components from, for example, values of the positions of the pixels included in the second linear components and values of the positions of the intersections. The integration unit 107 supplies data indicating an integrated second linear component group to the correction unit 109. The data may be data indicating the correspondence between, for example, a code by which an integrated second linear component group is uniquely identified and the codes for identifying second linear components described above. The integration unit 107 may correspond to an example of an "integration unit" according to an exemplary embodiment of the present invention.

The calculation unit 108 calculates a likelihood of the first set forming a table, using the data supplied from the first extraction unit 104 on the basis of the relationship between the linear components included in the first set. The term "table", as used herein, means a grid of linear components in the first direction and linear components in the second direction. Further, the likelihood of a table being formed may be a numerical representation of the index for determining whether or not the target image is a table. In this exemplary embodiment, the likelihood of a table being formed may be a value ranging from 0 to 1, where 0 represents the lowest likelihood and 1 represents the highest likelihood. The calculation unit 108 may calculate the likelihood of a table being formed using a known technique, for example, using the technique disclosed in Japanese Unexamined Patent Application Publication No. 2007-213255. The calculation unit 108 supplies the calculated value of the likelihood to the correction unit 109. The calculation unit 108 may correspond to an example of a "calculation unit" according to an exemplary embodiment of the present invention.

The correction unit 109 corrects the likelihood calculated by the calculation unit 108 in accordance with the relationship between the first set and the second set including the second linear components intersecting the first linear components included in the first set. This relationship may be any relationship represented by the position, length, shape, or any other parameter indicated by a pixel group included in each set. In this exemplary embodiment, the correction unit 109 calculates a value ranging from 0 to 1 as a correction value in accordance with the above relationship, and multiplies the value of the likelihood by the calculated correction value to correct the likelihood. The correction unit 109 supplies a value obtained as a result of the correction of the likelihood to the determination unit 110. The correction unit 109 may correspond to an example of a "correction unit" according to an exemplary embodiment of the present invention.

The determination unit 110 determines the degree to which the first set forms a table from the value of the likelihood supplied from the correction unit 109. For example, the determination unit 110 determines whether or not the value of the likelihood is larger than a threshold value. If the value of the likelihood is larger than the threshold value, the determination unit 110 determines that the first set represents a table. If the value of the likelihood is less than or equal to the threshold value, the determination unit 110 determines that the first set does not represent a table.

FIG. 3 is a flowchart illustrating a process in which the controller 100 determines a table from image data. First, the controller 100 obtains the image data supplied from the connection unit 500 (step S11). Then, the controller 100 binarizes the image represented by the obtained image data into black pixels and white pixels (step S12). Subsequently, the controller 100 performs a labeling process on pixels binarized into the black pixels (step S13). The controller 100 extracts linear components in the first direction and the second direction and linear components in a direction, which is different from the first and second directions, from the pixel group assigned a common label in the labeling process (step S14).

FIG. 4 illustrates an example of an image including linear components. In FIG. 4, an arrow x represents the first direction, and an arrow y represents the second direction. The direction indicated by the arrow x is hereinafter referred to as an "x-axis direction", and the direction indicated by the arrow y is hereinafter referred to as a "y-axis direction". An image G1 includes nine linear components L11 to L19 extending along the x-axis direction, and five linear components L21 to L25 extending along the y-axis direction. The linear components L11 to L19 and the linear components L21 to L25 intersect to form a grid of rectangles. The image G1 further includes seven linear components L31 to L37 extending along directions different from the x-axis direction and the y-axis direction. The image G1 is an image representing a line graph with scales and lines being formed by the linear components L11 to L19, L21 to L25, and L31 to L37. In this exemplary embodiment, an image like the image G1 including the second linear components (lines) intersecting the first linear components (scales) that form rectangles is not regarded as being a table. The controller 100 extracts the first and second linear components from the image G1.

Figure 5A:
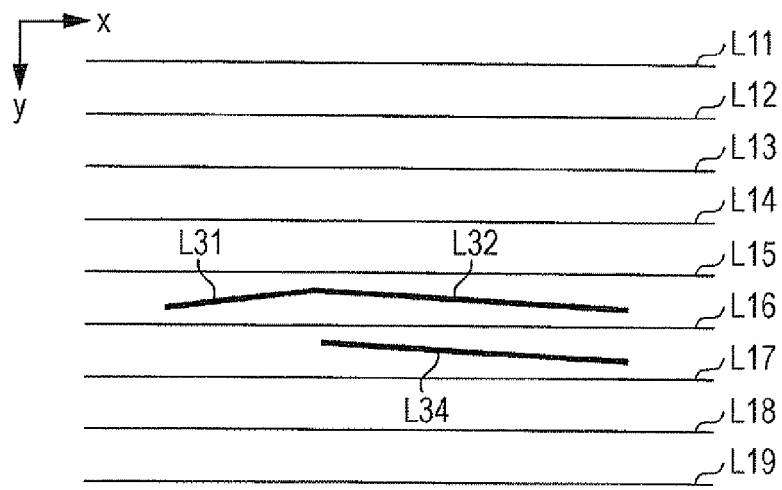
FIGS. 5A to 5C illustrate an example of first linear components extracted from the image.
Figure 5B:
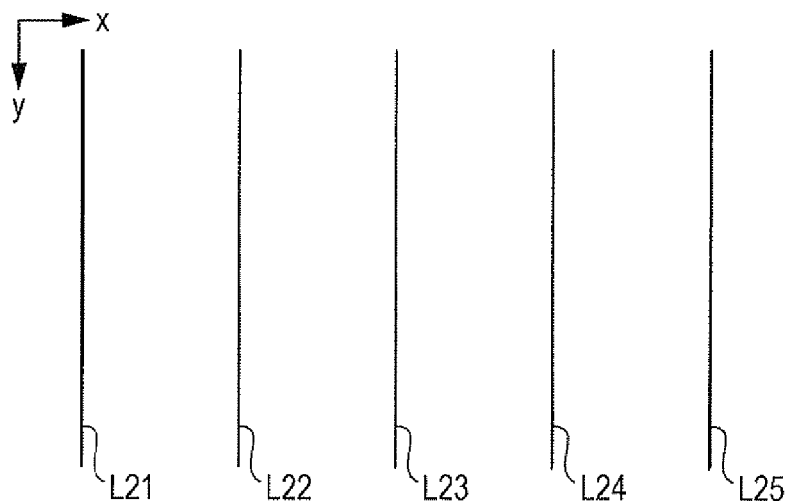
Figure 5C:
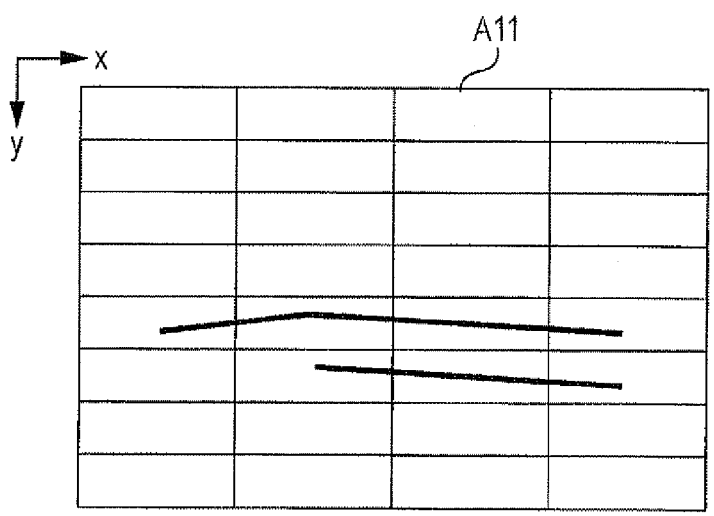

FIGS. 5A to 5C illustrate an example of the first linear components extracted from the image G1. FIG. 5A illustrates the first linear components in the x-axis direction among the linear components extracted by the controller 100. The controller 100 extracts the linear components L11 to L19 extending along the x-axis direction. In this exemplary embodiment, furthermore, the controller 100 may also extract, as the first set, a linear component inclined with respect to the first direction or the second direction if the inclination is within a predetermined range. In the illustrated example, the controller 100 extracts the linear components L31, L32 and L34 inclined with respect to the x-axis direction as the first set. FIG. 5B illustrates first linear components in the y-axis direction among the first linear components extracted by the controller 100. The controller 100 extracts the linear components L21 to L25 extending along the y-axis direction. FIG. 5C illustrates a result of merging the first linear components illustrated in FIGS. 5A and 5B. The controller 100 extracts the illustrated linear components as a first set A11.

Figure 6A:
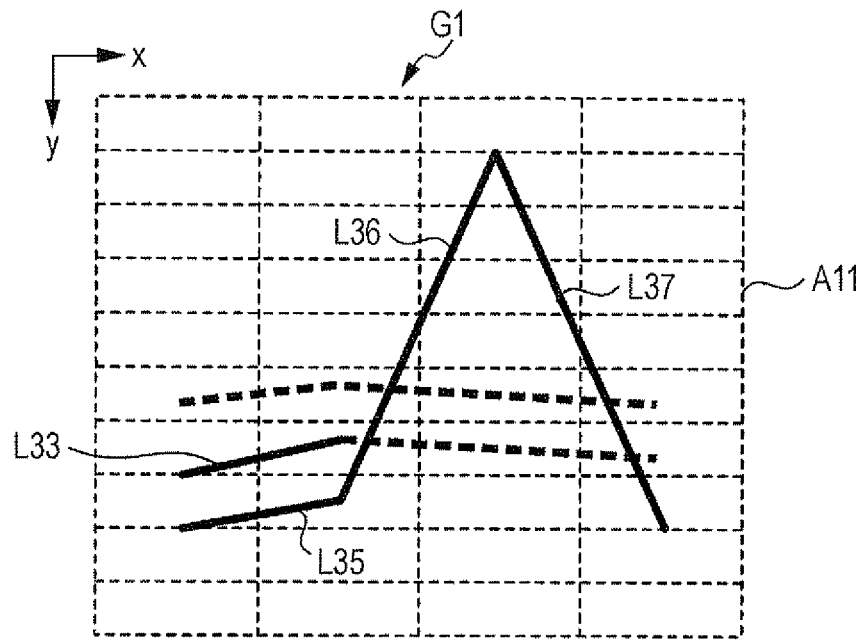
Figure 6B:
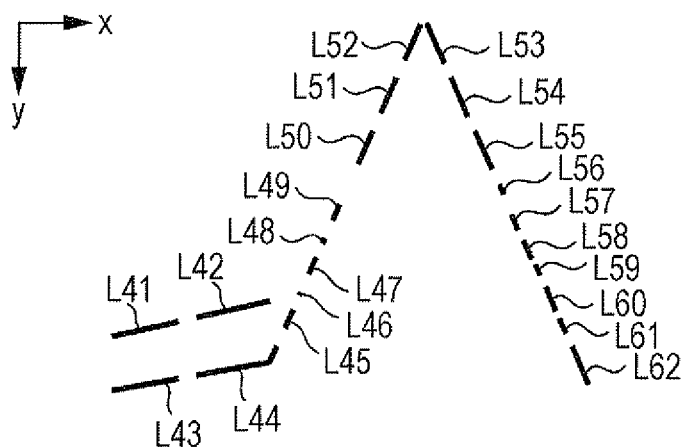

FIGS. 6A and 6B illustrate an example of the second linear components extracted from the image G1. FIG. 6A illustrates the image G1 in which the first linear components included in the first set A11 are indicated by broken lines. In FIG. 6A, the linear components L33, L35, L36 and L37 indicated by solid lines are linear components that are not included in the first set A11. The controller 100 extracts, as second linear components, linear components obtained by removing the pixels of the first linear components included in the first set A11 from the illustrated linear components. The second linear components extracted in the above manner include plural linear components into which an original single linear component is separated by the first linear components. In the illustrated example, as illustrated in FIG. 6B, the controller 100 extracts 22 second linear components L41 to L62.

Figure 7A:
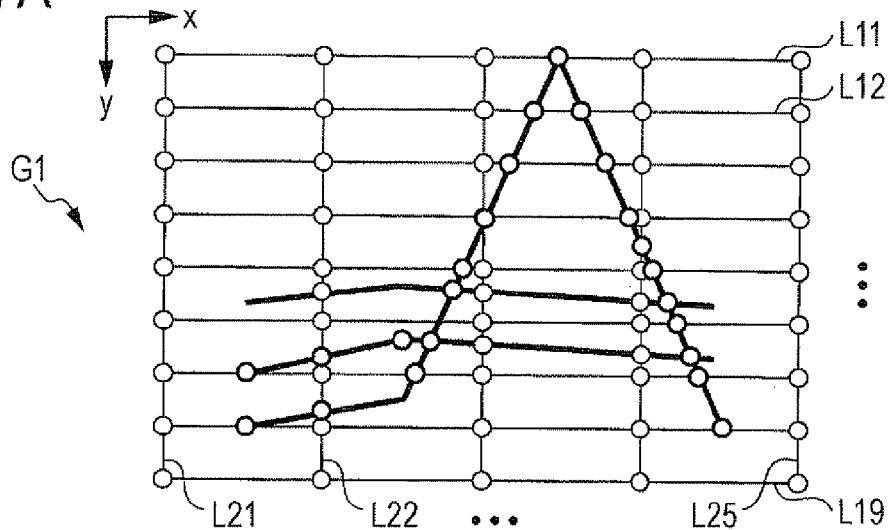
FIGS. 7A to 7C illustrate an example of intersections detected from the image.
Figure 7B:
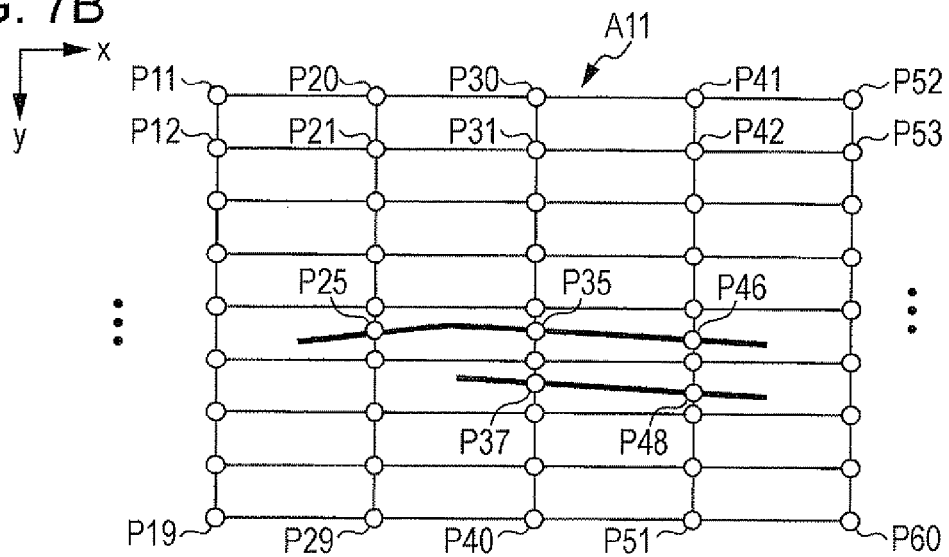
Figure 7C:
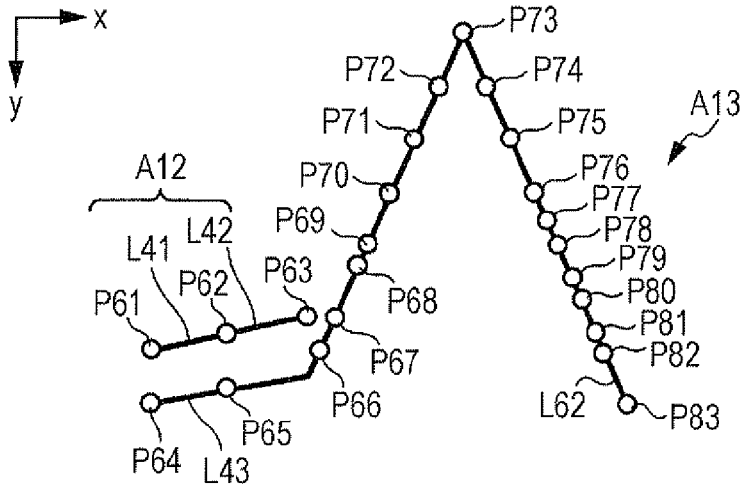

After the extraction of the first and second linear components, the controller 100 detects intersections of the first and second linear components (step S15). FIGS. 7A to 7C illustrate an example of the intersections detected from the image G1. FIG. 7A illustrates the intersections detected in the image G1. In FIGS. 7A to 7C, to make the intersections distinguishable from each other, a filled circle or an unfilled circle is plotted at the position of each intersection. The filled circles represent the positions of the intersections of the first linear components, and the unfilled circles represent the positions of the intersections of the other linear components. FIG. 7B illustrates 50 intersections P11 to P60 of the first linear components in the first set A11. FIG. 7C illustrates 23 intersections P61 to P83 of the second linear components L41 to L62. The controller 100 generates intersection data indicating the intersections P11 to P60 and P61 to P83.

The controller 100 integrates the second linear components on the basis of the generated intersection data (step S16). In this example, the controller 100 specifies intersecting second linear components from the data indicating the second linear components L41 to L62 and the intersection data indicating the intersections P61 to P83. In this exemplary embodiment, for example, like the second linear components L41 and L42 illustrated in FIG. 7C, second linear components do not directly intersect but intersect a first linear component at a common intersection (P62) are regarded as intersecting. In this case, the controller 100 integrates the second linear components L41 and L42. Since the second linear components L43 to L62 intersect at the intersections P65 to P82, the controller 100 also integrates the second linear components L43 to L62.

Subsequently, the controller 100 calculates a likelihood of the first set forming a table from the data indicating the extracted first linear components (step S17). In this example, the controller 100 calculates the likelihood for the first set A11 on the basis of the data indicating the first linear components L11 to L19, L21 to L25, L31, L32, and L34 included in the first set A11. Then, the controller 100 repeats the processing of steps S18 to S21 to calculate a value (correction value) for correcting the calculated likelihood.

The controller 100 selects the combination of the first set to be used for the calculation of a correction value (or the linear components included in the first set) and the second set that has intersections with the first set (or the linear components included in the second set), from among the extracted linear components (step S18). Then, the controller 100 determines whether or not the selected combination satisfies a predetermined condition (step S19). The predetermined condition may be that the selected combination corresponds to, for example, a shape specific to a table. If it is determined that the selected combination satisfies the condition (YES in step S19), the controller 100 does not use the combination for the calculation of a correction value. That is, the controller 100 does not perform the correction of the likelihood based on a combination that does not satisfy the condition. In this exemplary embodiment, the controller 100 selectively uses four conditions as the conditions. The conditions will described hereinafter with reference to FIGS. 8, 9A, and 9B.

Figure 8:
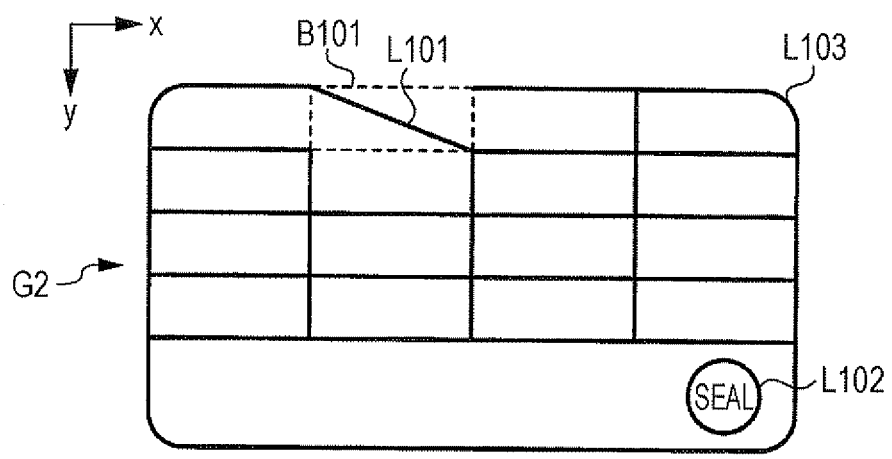
FIG. 8 illustrates an example of a shape specific to a table.

The first condition is that combinations of linear components correspond to rectangles that are cells of a table and a diagonal of the rectangles. FIG. 8 illustrates an example of a shape specific to a table. An image G2 is an image including plural linear components forming a table. A rectangle B101 is formed by first linear components. In FIG. 8, for ease of distinction from other linear components, the rectangle B101 is indicated by a broken line. A linear component L101 is a diagonal of the rectangle B101. The rectangle B101 and the linear component L101 correspond to one of the rectangles (cells) of the table and a diagonal (slanting line) drawn in the rectangle, respectively. For example, when a selected first linear component is a portion of the rectangle B101 and a second linear component intersecting the rectangle B101 corresponds to the linear component L101, the controller 100 does not use the first linear component and the second linear component for the correction of the likelihood.

The second condition is that a combination of linear components corresponds to a shape that is generally used for a table (particularly, a ledger table or the like). The shape may be, for example, a circle indicating an area where a seal is placed in a ledger or the like. A linear component L102 illustrated in FIG. 8 is a second linear component representing a circle which is a shape (a circle indicating an area where a seal is placed) generally used in a table. When a shape represented by a combination of first and second linear components, for example, a selected first linear component and a second linear component included in a second set intersecting the first linear component, corresponds to the shape represented by the linear component L102, the controller 100 does not use the first linear component or the second linear component for the correction of the likelihood. Even if the above shape is represented only by a selected second linear component, the controller 100 may not use the second linear component for the correction of the likelihood.

The third condition is that a combination of linear components corresponds to a shape in which a corner of the outer periphery of a table is rounded (the shape is hereinafter referred to as a "round corner shape"). A linear component L103 illustrated in FIG. 8 is a second linear component having a first end intersecting a first linear component in the first direction and a second end intersecting a first linear component in the second direction. In this case, the linear component L103 has a round corner shape. For example, when a second linear component included in a selected second set corresponds to the linear component L103, the controller 100 does not use the second linear component for the correction of the likelihood. Even if the above shape is represented only by a second linear component, the controller 100 may not use the second linear component for the correction of the likelihood.

Figure 9A:
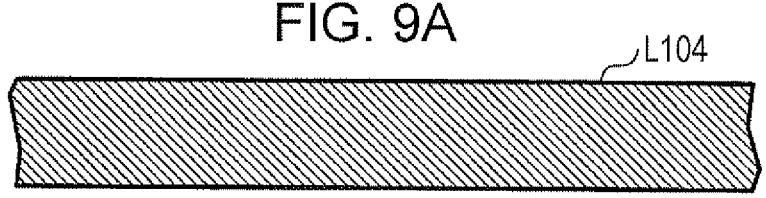
FIGS. 9A and 9B illustrate an example of a printed line and a handwritten line, respectively.
Figure 9B:

The fourth condition is that a combination of linear components includes a handwritten linear component. Specifically, the controller 100 determines whether or not a linear component is handwritten in accordance with the degree of change in thickness of the linear component. FIGS. 9A and 9B illustrate an example of a printed line and a handwritten line, respectively. FIG. 9A illustrates a linear component L104 which may be an example of a printed line, and FIG. 9B illustrates a linear component L105 which may be an example of a handwritten line. The change in thickness of the linear component L105 is greater than that of the linear component L104. When the degree of change in thickness of a second linear component included in a selected second set exceeds a threshold value, the controller 100 does not use the second linear component for the correction of the likelihood. The threshold value may be determined as desired.

Then, the controller 100 determines whether or not any combination other than a selected combination is found (step S21). If it is determined that any other combination is found (YES in step S21), the controller 100 performs the processing of step S18. If it is determined that a selected set or linear component does not satisfy a predetermined condition (NO in step S19), the controller 100 calculates a correction value on the basis of the set or linear component (step S20). In this exemplary embodiment, the controller 100 may calculate a correction value by selectively using seven methods. The seven methods will be described hereinafter with reference to FIGS. 10A to 15.

(1) In a case where a first set and an integrated second linear component including second linear components intersecting first linear components included in the first set are selected, the controller 100 corrects the likelihood in accordance with the magnitude relationship between the size of the selected first set and the size of the integrated second linear component. The size of the first set or the integrated second linear component may be determined on the basis of, for example, dimensions of each set in the x-axis direction and the y-axis direction.

Figure 10A:
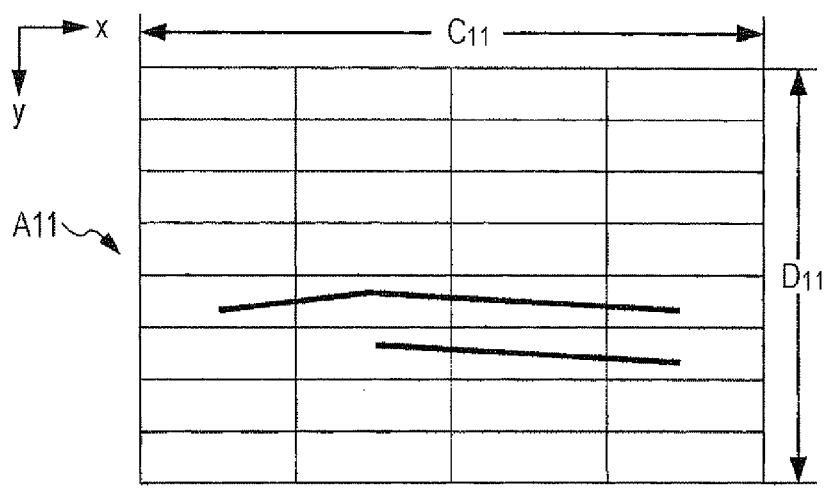
FIGS. 10A and 10B illustrate the size of a first set and an integrated second linear component.
Figure 10B:
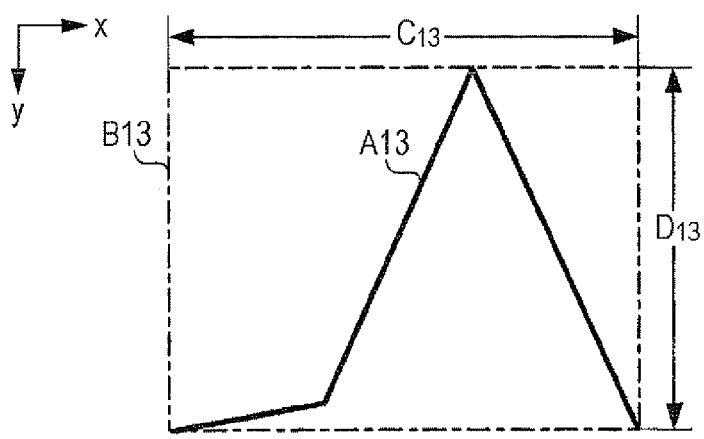

FIGS. 10A and 10B illustrate the size of the first set and the integrated second linear component. FIG. 10A illustrates the size of the first set A11. The first set A11 has a dimension $C_{11}$ in the x-axis direction and a dimension $D_{11}$ in the y-axis direction. FIG. 10B illustrates the size of an integrated second linear component A13 including the second linear component L43 illustrated in FIG. 7C. The integrated second linear component Al3 has a dimension $C_{13}$ in the x-axis direction and a dimension $D_{13}$ in the y-axis direction. The controller 100 compares the size of the first set and the integrated second linear component with the size of, for example, a rectangle B13 having opposite sides extending along the x-axis direction and the y-axis direction, where the opposite sides have lengths $C_{13}$ and $D_{13}$. The controller 100 calculates the ratio of the length of the outer periphery of the first set A11, which is given by $(C_{11}+D_{11})\times 2$, to the length of the outer periphery of the rectangle B13, which is given by $(C_{13}+D_{13})\times 2$, and corrects the likelihood in accordance with the calculated value. For example, the controller 100 may set the correction value to be close to 1 if the rectangle B13 is smaller than the first set A11, and sets the correction value to 1 (that is, does not change the likelihood) if the size of the rectangle B13 is smaller than the first set A11 by a predetermined amount or more.

(2) In a case where the first linear components included in the first set and the second linear components included in the second set are selected, the controller 100 calculates the ratio of the number of intersections of the second linear components and rectangles formed by the first linear components when the second linear components are diagonals of the rectangles to the total number of intersections of the first linear components and the second linear components. The controller 100 corrects the likelihood in accordance with the calculated ratio.

Figure 11:
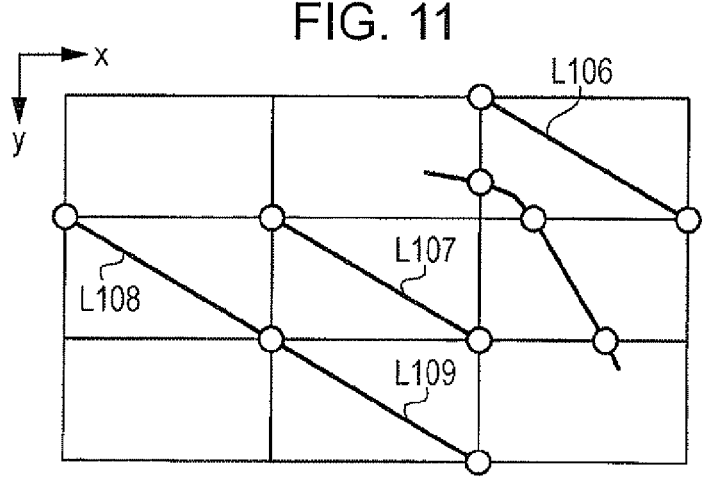
FIG. 11 illustrates an example of a table including diagonals.

FIG. 11 illustrates an example of a table including diagonals. In the illustrated example, the number of intersections of first linear components and second linear components is ten in total. Second linear components L106, L107, L108, and L109 are diagonals of rectangles formed by the first linear components. That is, the controller 100 calculates the ratio of the number of (seven) intersections of the second linear components that are diagonals to the total number of (ten) intersections (7÷10=0.7). The controller 100 corrects the likelihood in accordance with the calculated value. For example, the controller 100 corrects the likelihood by multiplying the likelihood by the calculated value as a correction value. In this case, if all the second linear components are diagonals of rectangles, the correction value is set to 1, and the controller 100 does not change the likelihood. As the ratio of second linear components defining diagonals of rectangle to all the second linear components decreases, the controller 100 reduces the value of the likelihood.

(3) In a case where first linear components included in a first set forming a rectangle and a second linear component included in a second set intersecting the rectangle are selected, the controller 100 calculates the distance between intersections of the rectangle and a diagonal that is assumed to be included in the rectangle and intersections of the first linear components forming the rectangle and the second linear component. The controller 100 corrects the likelihood in accordance with the calculated distance.

Figure 12:
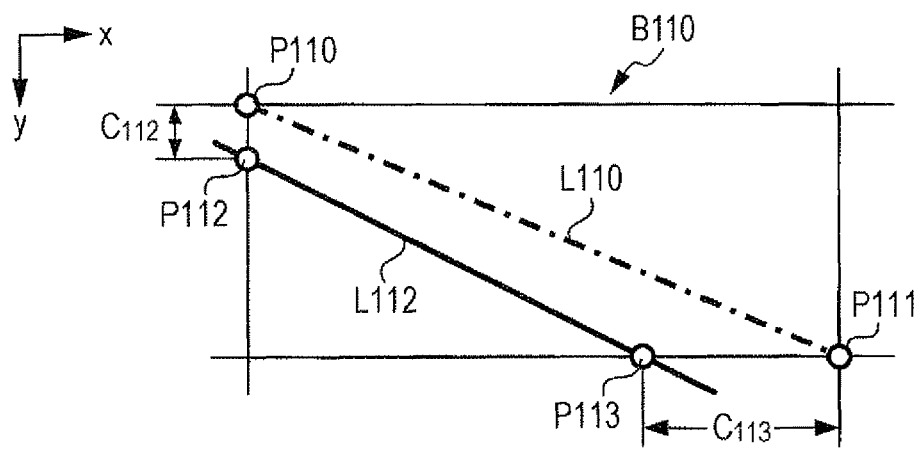
FIG. 12 illustrates an example of a second linear component intersecting a rectangle formed by first linear components.

FIG. 12 illustrates an example of a second linear component intersecting a rectangle formed by first linear components. In the illustrated example, a second linear component L112 intersects a rectangle B110 at intersections P112 and P113. The intersections P112 and P113 are located at positions with distances $C_{112}$ and $C_{113}$ from intersections P110 and P111, respectively, when the rectangle B110 has a diagonal L110. In this case, the controller 100 corrects the likelihood in accordance with the magnitudes of the distances $C_{112}$ and $C_{113}$. For example, the controller 100 may reduce the likelihood as the intersections of the second linear component are located at positions far from intersections of a diagonal.

(4) In a case where a combination of plural intersecting linear components included in a first set or a second set is selected, the controller 100 calculates the value of the degree of similarity of a shape formed by the combination to a predetermined shape. The predetermined shape may be a shape specific to a table, and may be, for example, a circle such as the linear component L102 illustrated in FIG. 8. The controller 100 may calculate the value of the degree of similarity of a shape using a known technique. The controller 100 corrects the likelihood in accordance with the calculated value of the degree. For example, the controller 100 may reduce the likelihood as the similarity of the shape formed by the linear components to the shape specific to the table decreases. Even if the shape is represented only by the selected second linear components, the controller 100 may correct the likelihood in accordance with the calculated value of the degree.

(5) In a case where first linear components and second linear components intersecting the first linear components are selected, the controller 100 corrects the likelihood in accordance with the difference in line type among the linear components. The term "line type", as used herein, refers to the type of a line such as a line pattern of a linear component (for example, a solid line, broken line, or chain line), a line thickness, or a line shape (for example, a wavy line or double line). For example, if it is assumed that a first set and a second set form a table, the controller 100 corrects the likelihood when it is determined that the line types of the first and second sets or the combination of the first and second sets are not acceptable as those of a table.

Figure 13:
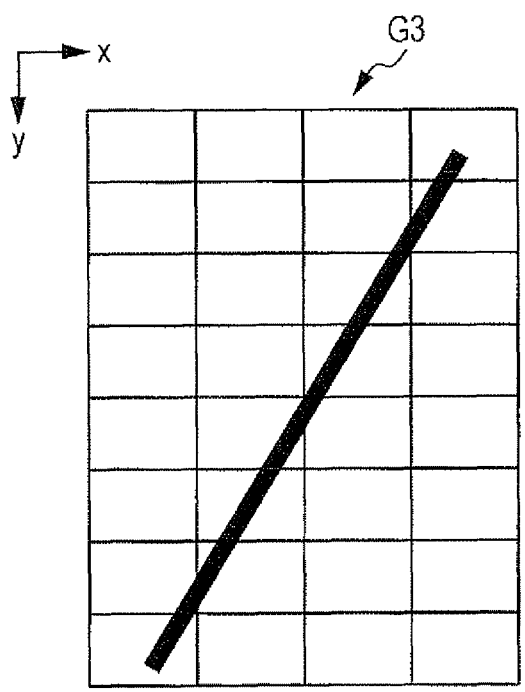
FIG. 13 illustrates an example of an image including linear components having different line types.

FIG. 13 illustrates an example of an image including linear components having different line types. An image G3 is an image in which a line formed by a linear component thicker than linear components in the x-axis direction (first direction) and linear components in the y-axis direction (second direction) is drawn across rectangles formed by the linear components. In this exemplary embodiment, an image like the image G3 having a second linear component thicker than first linear components forming rectangles by a predetermined amount or more is regarded as being not a table. In this case, the controller 100 extracts linear components arranged in a grid as first linear components, and extracts linear components intersecting the first linear components as second linear components. Then, the controller 100 reduces the likelihood in accordance with, for example, the increase in the ratio of the thickness of extracted second linear components to the thickness of extracted first linear components.

(6) In a case where first linear components and second linear components are selected, the controller 100 calculates the ratio of the number of ends of second linear components having first ends intersecting ends of first linear components in the first direction and second ends intersecting end of first linear components in the second direction to the number of intersections of the first linear components and the second linear components. The controller 100 corrects the likelihood in accordance with the calculated ratio.

Figure 14A:
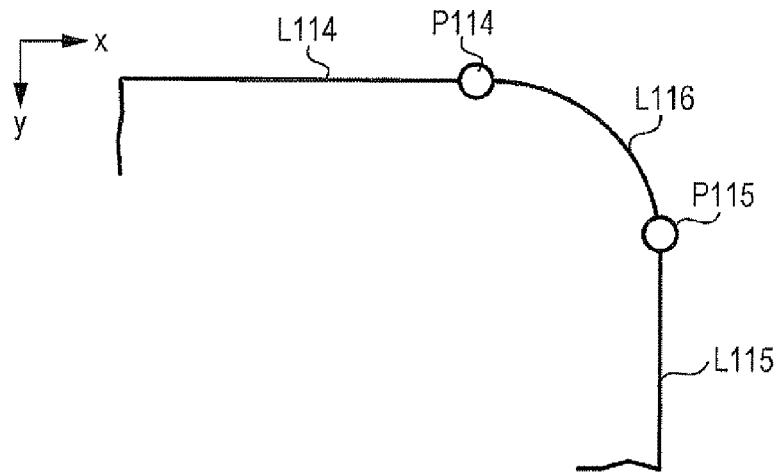
FIGS. 14A and 14B illustrate an example of first linear components and second linear components.
Figure 14B:
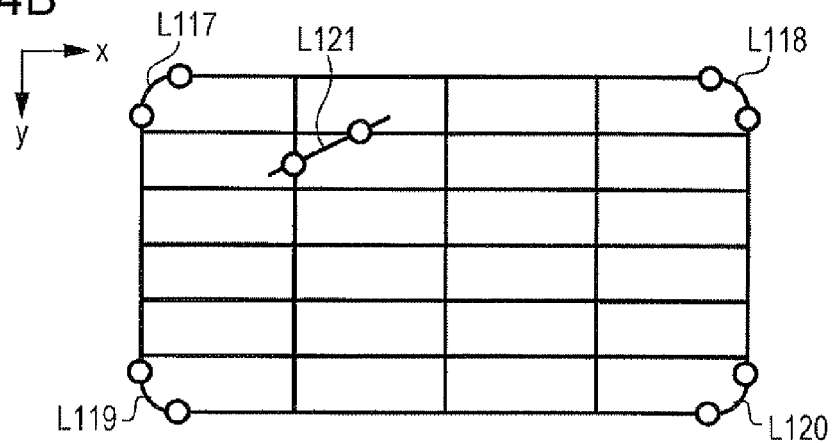

FIGS. 14A and 14B illustrate an example of first linear components and second linear components. FIG. 14A illustrates an example of first linear components and second linear components, where the ends of the first linear components and the ends of the second linear components intersect. A first linear component L114 is a linear component extending along the x-axis direction. A first linear component L115 is a linear component extending along the y-axis direction. The first linear components L114 and L115 intersect a second linear component L116 at intersections P114 and P115, respectively, each of the intersections P114 and P115 being located at an end of a corresponding one of the first linear components L114 and L115. The controller 100 determines the total number of ends of the second linear component L116. FIG. 14B illustrates a table with round corners. In the illustrated example, the controller 100 extracts second linear components L117 to L121, and extracts other linear components as first linear components. In this case, the controller 100 determines that the second linear components L117 to L121 are second linear components each having an end intersecting a first linear component in the first or second direction. Then, the controller 100 calculates the ratio of the number of (eight) ends of the second linear components L117 to L121 to the number of (ten) intersections of the second linear components L117 to L121 and the first linear components (8÷10=0.8). The controller 100 corrects the likelihood by multiplying the likelihood by the calculated value as a correction value. In this case, since the correction value is set to 1 if all the second linear components correspond to the second linear component L116, the controller 100 does not change the likelihood, and reduces the value of the likelihood as the ratio of second linear components corresponding to the second linear component L116 to all the second linear components decreases.

(7) In a case where first linear components and second linear components that intersect are selected, if it is assumed that a second linear component having a first end intersecting a first linear component in the first direction and a second end intersecting a first linear component in the second direction is found, the controller 100 corrects the likelihood in accordance with the distance between the points at which the first linear components and the second linear component intersect and intersections of linear components included in a first set and a linear component included in a second set.

Figure 15:
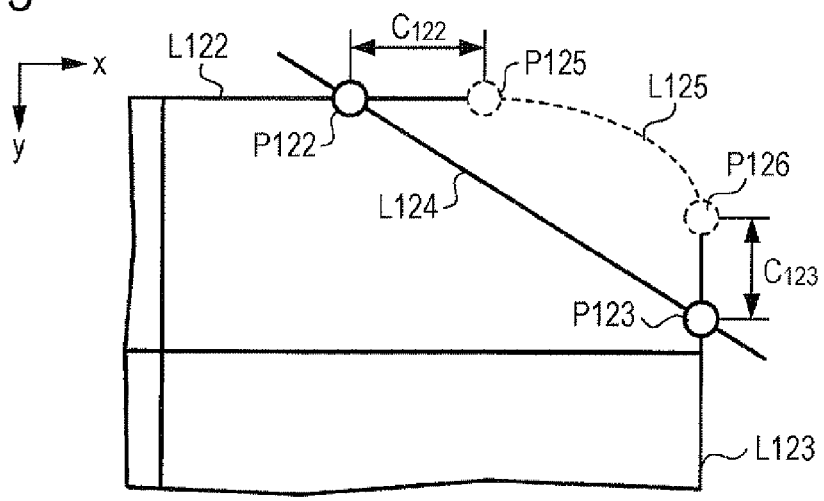
FIG. 15 illustrates an example of first linear components and a second linear component that intersect.

FIG. 15 illustrates an example of first linear components and a second linear component that intersect. A first linear component L122 is a first linear component extending along the x-axis direction (first direction), and a first linear component L123 is a first linear component extending along the y-axis direction (second direction). A second linear component L125 is a second linear component intersecting the first linear components L122 and L123 at intersections P122 and P123, respectively. In FIG. 15, a portion of the second linear component L125, which is indicated by a broken line, is an imaginary second linear component when it is assumed that a first end of the imaginary second linear component intersects the first linear component L122 at an intersection P125 and a second end of the imaginary second linear component intersects the first linear component L123 at an intersection P126. In this case, the controller 100 corrects the likelihood in accordance with a distance $C_{122}$ between the intersections P122 and P125 and a distance $C_{123}$ between the intersections P123 and P126. For example, the controller 100 may reduce the likelihood as the distances $C_{122}$ and $C_{123}$ increase.

If it is determined in step S21 that no other set or linear component to be selected is found (NO in step S21), the controller 100 corrects the likelihood described above on the basis of calculated correction values (step S22). The controller 100 corrects the likelihood by, for example, multiplying the likelihood by the correction values in turn. Then, the controller 100 determines whether or not the first set forms a table on the basis of the corrected value of the likelihood (step S23). After the completion of the processing of step S23, the controller 100 ends the process.

Modifications

The foregoing exemplary embodiment is merely an exemplary embodiment of the present invention. It is to be understood that the present invention may be embodied by making the following modifications to the foregoing exemplary embodiment. The following modifications may be used in combination, as desired, in accordance with necessity.

First Modification

The present invention is not limited to an exemplary embodiment in which image components used for the correction of likelihood are linear. For example, in a modification, aggregated components may be extracted in addition to linear components and may be used for the correction of likelihood.

Figure 16:
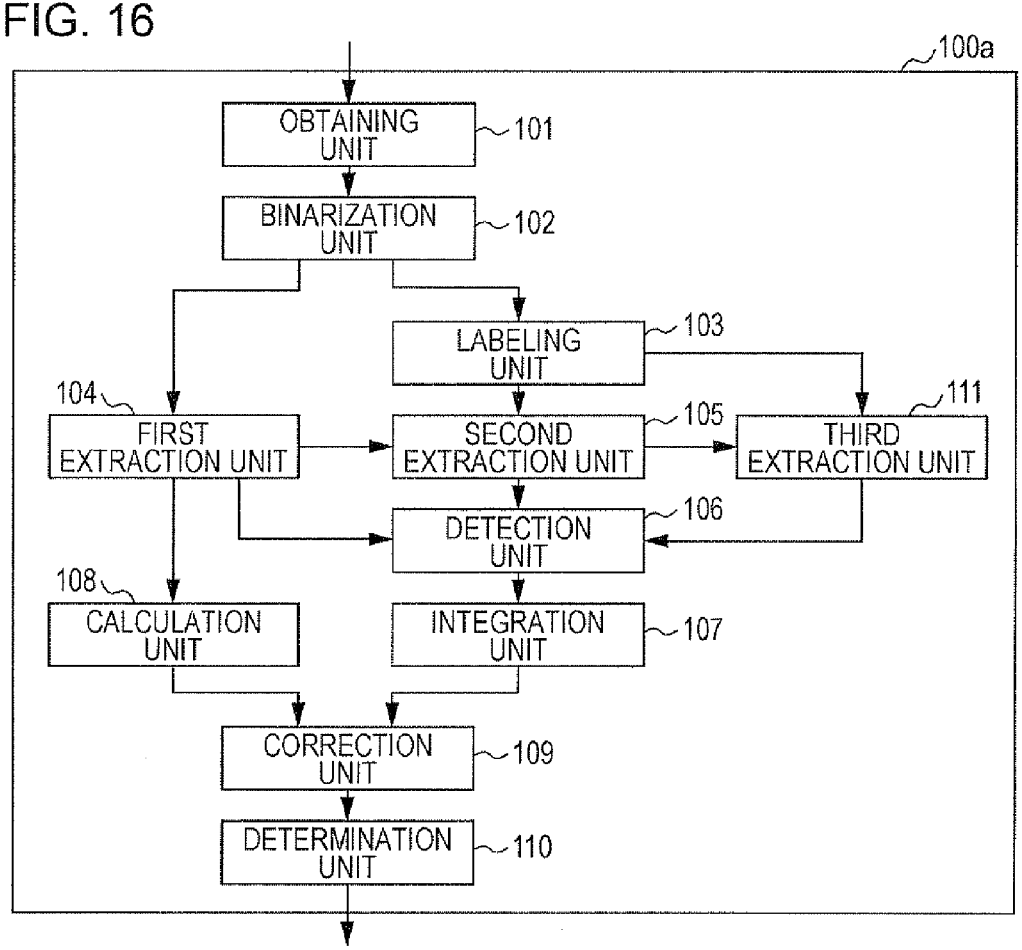
FIG. 16 is a block diagram illustrating an example of the functional configuration of a controller.

FIG. 16 is a block diagram illustrating an example functional configuration of a controller 100*a* according to this modification. The controller 100*a* illustrated in FIG. 16 is different from the controller 100 according to the foregoing exemplary embodiment in that the controller 100*a* includes a third extraction unit 111. The labeling unit 103 supplies data indicating a pixel group assigned a label to the third extraction unit 111. The second extraction unit 105 supplies data indicating a first set and data indicating a second linear component supplied from the first extraction unit 104 to the third extraction unit 111. The third extraction unit 111 extracts, as a third set, no-linear aggregated components (hereinafter referred to as "aggregate components") from the image on the basis of the above supplied data. Specifically, the third extraction unit 111 removes pixels included in first linear components from the pixel group assigned the label, and sets a pixel group from which pixels included in the second linear component have been removed, from the remaining pixel group as an aggregate component. The third extraction unit 111 extracts the resulting pixel group (aggregate component) as a third set. The third extraction unit 111 supplies data indicating the extracted third set to the detection unit 106. The data may be data indicating, for example, the correspondence between a code by which an aggregate component included in the third set is uniquely identified and values indicating the positions of pixels included in the aggregate component. The third extraction unit 111 may correspond to an example of a "third extraction unit" according to an exemplary embodiment of the present invention.

The detection unit 106 detects portions where the aggregate component and the first linear components come into contact with each other (hereinafter referred to as "contact portions") on the basis of the data supplied from the first extraction unit 104 and the third extraction unit 111. The detection unit 106 supplies data indicating the detected contact portions to the integration unit 107, and the integration unit 107 supplies the data to the correction unit 109. The detection unit 106 may supply the data directly to the correction unit 109. The data may be data indicating the correspondence between, for example, a code by which a contact portion is uniquely identified and values indicating the positions of pixels included in the contact portion. The correction unit 109 corrects the likelihood on the basis of the data indicating the contact portion.

Figure 17:
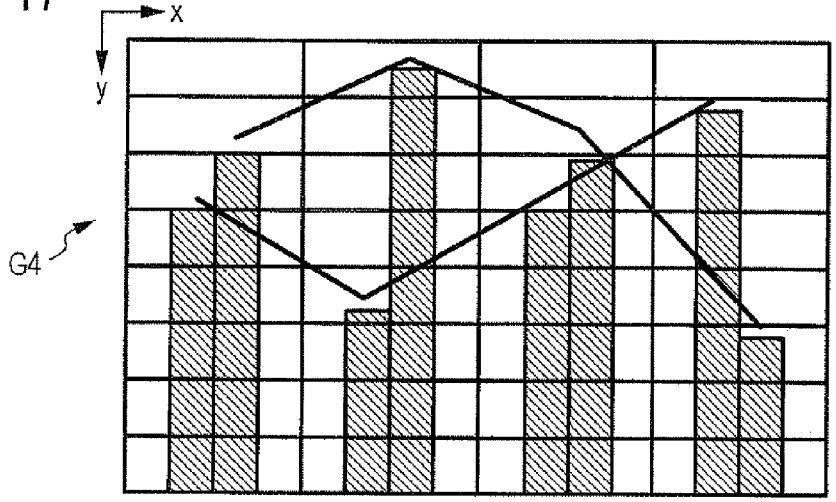
FIG. 17 illustrates an example of an image including aggregate components.
Figure 18A:
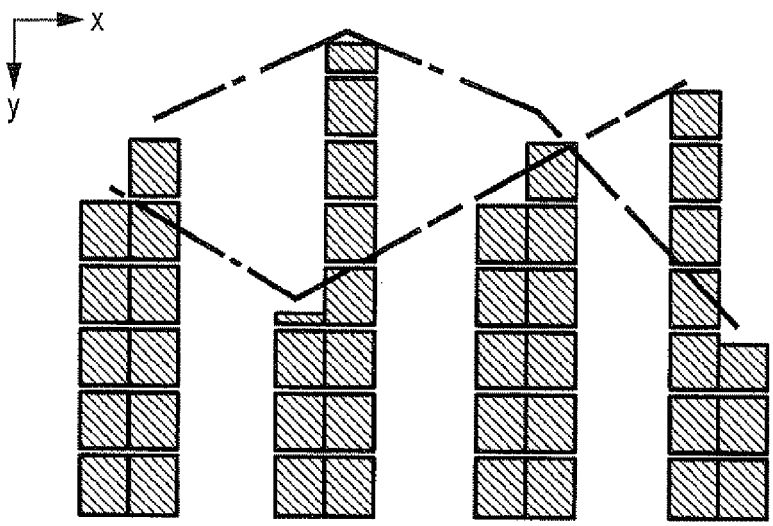
FIGS. 18A to 18C illustrate respective components extracted from the image.
Figure 18B:
Figure 18C:
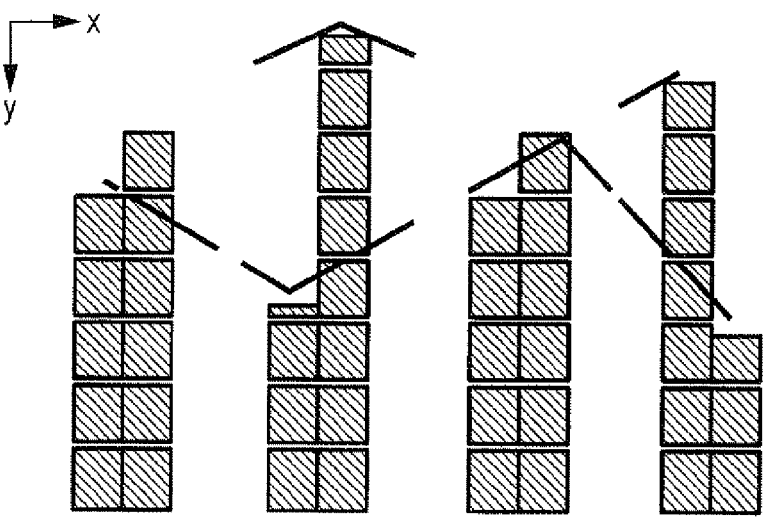

FIG. 17 illustrates an example of an image including aggregate components. An image G4 is an image in which a bar graph is represented by linear components and aggregate components. In the illustrated example, the aggregate components correspond to bars in the bar graph, and the linear components correspond to lines in a line graph and correspond to a frame, scales, and the like of a graph. In this modification, an image like the image G4 having aggregate components (bars in the bar graph) that come in contact with first linear components (scales) defining rectangles is regarded as being not a table. FIGS. 18A to 18C illustrate individual components extracted from the image G4. FIG. 18A illustrates an image obtained by removing the first linear components from the image G4. The illustrated image contains second linear components and aggregate components. FIG. 18B illustrates an image indicating the second linear components extracted from the image illustrated in FIG. 18A. In the illustrated example, only second linear components that do not come in contact with the aggregate components have been extracted. FIG. 18C illustrates an image indicating aggregate components extracted from the image illustrated in FIG. 18A by excluding the second linear components. The controller 100*a* extracts the image illustrated in FIG. 18C as aggregate components from the image G4.

Figure 19A:
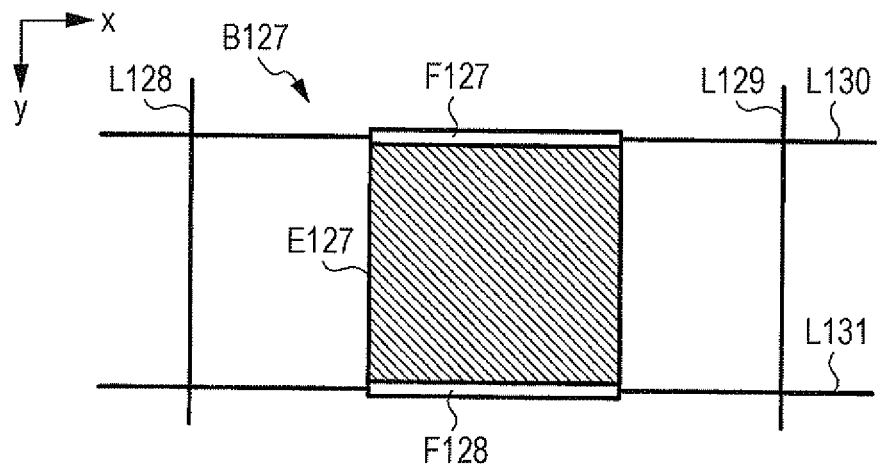
FIGS. 19A and 19B illustrate an example of an aggregate component that comes in contact with a rectangle formed by first linear components.
Figure 19B:
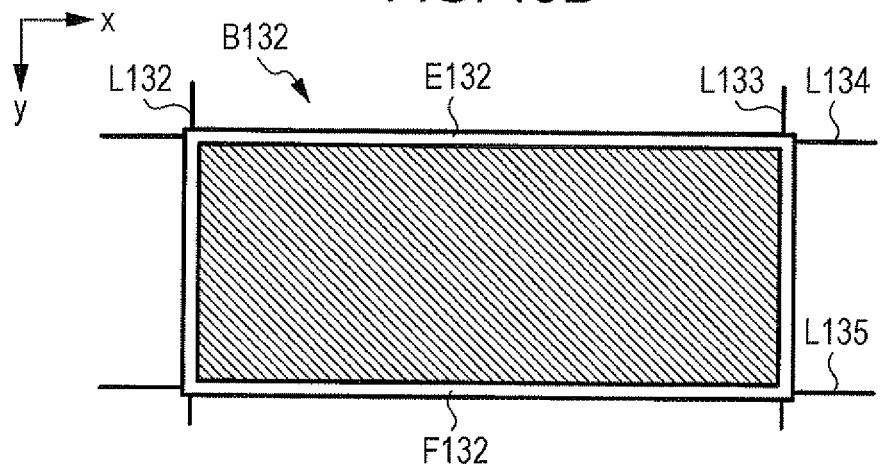

FIGS. 19A and 19B illustrate an example of aggregate components that come in contact with a rectangle formed by first linear components. FIG. 19A illustrates an aggregate component E127 that is a portion of a rectangle and that comes in contact with the rectangle. The aggregate component E127 is located inside a rectangle B127 formed by first linear components L128, L129, L130, and L131. Further, the aggregate component E127 comes in contact with the first linear component L130 at a contact portion F127 and comes in contact with the first linear component L131 at a contact portion F128. In FIGS. 19A and 19B, for ease of understanding, contact portions are indicated by black-outlined empty figures. The controller 100*a* corrects the likelihood in accordance with the relationship between the rectangle B127 and the contact portions F127 and F128. For example, the controller 100*a* may reduce the likelihood as the ratio of the length of the contact portions F127 and F128 to the length of the inner periphery of the rectangle B127 decreases. The controller 110a may correct the likelihood in accordance with the degree of similarity between the shape of a rectangle and the shape of a contact portion.

Further, if the shape of a contact portion between a selected rectangle and an aggregate component corresponds to the shape of the rectangle, the controller 100a does not use the rectangle and the aggregate component for the correction of likelihood. That is, it is an example of the predetermined conditions described above that the shape of a contact portion corresponds to the shape of a rectangle formed by first linear components. FIG. 19B illustrates an aggregate component E132 that comes in contact with the entire inner periphery of a rectangle. The aggregate component E132 is located inside a rectangle B132 formed by first linear components L132, L133, L134, and L135. The shape of a contact portion F132 between the aggregate component E132 and the rectangle B132 corresponds to the shape of the rectangle B132. It is assumed that the controller 100a selects the rectangle B132 and the aggregate component E132. In this case, since the rectangle B132 and the aggregate component E132 satisfy the condition described above (that is, the shape of the contact portion F132 corresponds to the shape of the rectangle B132), the controller 100a does not use the rectangle B132 or the aggregate component E132 for the correction of likelihood.

Second Modification

In the foregoing exemplary embodiment, the controller 100 corrects the likelihood in accordance with the relationship between individual sets or components when first linear components and second linear components (or aggregate components) intersect (or come in contact). However, this is not to be construed as limiting the invention. For example, the controller 100 may correct the likelihood in accordance with the relationship between a first set and a second set included in the first set. In this case, the controller 100 determines whether or not the second set is included in the first set on the basis of values indicating the positions of pixels included in the individual sets. That is, it may be only required that the controller 100 not use the second set that is not related to the first set for the correction of likelihood. Examples of the second set include a second set that is located outside a first set and that has no intersection with the first set.

Third Modification

The controller 100 may determine whether or not a selected second linear component corresponds to a round corner by using a method different from that in the foregoing exemplary embodiment. For example, when a selected second linear component has the shape of an arc equal to one quarter of the circumference of a circle and ends of the arc intersect selected first linear components in the first direction and the second direction, the controller 100 may determine that the second linear component corresponds to a round corner.

Fourth Modification

The controller 100 may calculate a correction value using the size of a first set and the size of a second set. In this case, the controller 100 may calculate the ratio of the area of a region surrounded by the outer periphery of the first set A11 to the area of region surrounded by the rectangle B13, and may use the calculated ratio for the correction of likelihood. The controller 100 may also calculate, as a correction value, the ratio of the value of the sum of the dimensions of the individual sets in the x-axis direction to the value of the sum of the dimensions of the individual sets in the y-axis direction (in FIGS. 10A and 10B, the ratio of $C_{11}+D_{11}$ to $C_{13}+D_{13}$).

Fifth Modification

The first direction and the second direction may intersect each other at an angle other than right angle. In the foregoing exemplary embodiment, a quadrilateral (rectangle or square) is formed by first linear components in the first direction and the second direction. In a modification, a parallelogram may be formed by the first linear components.

Sixth Modification

The present invention may also be embodied in the form of an image determination apparatus, an information processing apparatus including the image determination apparatus, methods for implementing the image determination apparatus and the information processing apparatus, and a program for causing a computer to implement the functions illustrated in FIG. 2 or 16. The program may be provided in the form of a recording medium storing the same, such as an optical disk, or any other form such as causing a computer to download the program via a network such as the Internet and to install it therein for use.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be formed by the following claims and their equivalents.

What is claimed is:

1. An image determination apparatus comprising:
    a first extraction unit that extracts a first set from an image including linear components that are line-shaped components, the first set including a linear component extending along a first direction and a linear component extending along a second direction intersecting the first direction;
    a second extraction unit that extracts a second set including a linear component extending along a direction different from the first direction and the second direction;
    a calculation unit that calculates a likelihood for the first set extracted by the first extraction unit in accordance with a relationship between linear components included in the first set, the likelihood being a likelihood of a table being formed; and
    a correction unit that corrects the likelihood calculated by the calculation unit in accordance with a relationship between the first set and the second set.

2. The image determination apparatus according to claim 1, further comprising a detection unit that detects an intersection of linear components extracted by the first extraction unit or the second extraction unit,
    wherein the correction unit corrects the likelihood in accordance with a relationship between the first set and the second set based on a detection result obtained by the detection unit.

3. The image determination apparatus according to claim 2, further comprising an integration unit that integrates intersecting linear components extracted by the second extraction unit in accordance with a detection result obtained by the detection unit,
    wherein the correction unit corrects the likelihood in accordance with a magnitude relationship between a size of the first set and a size of an integrated linear component that is obtained by the integration unit and that intersects a linear component included in the first set.

4. The image determination apparatus according to claim 2, wherein the correction unit corrects the likelihood in accordance with a ratio of the number of intersections of linear components included in the first set and linear components included in the second set to the number of intersections of parallelograms formed by linear components included in the first set and diagonals formed by linear components included in the second set.

5. The image determination apparatus according to claim 3, wherein the correction unit corrects the likelihood in accordance with a ratio of the number of intersections of linear components included in the first set and linear components included in the second set to the number of intersections of parallelograms formed by linear components included in the first set and diagonals formed by linear components included in the second set.

6. The image determination apparatus according to claim 2, wherein a linear component included in the second set represents a diagonal of a parallelogram formed by linear components included in the first set, and the correction unit corrects the likelihood in accordance with a distance between an intersection of the parallelogram and the diagonal and an intersection of the linear components included in the first set and the linear component included in the second set.

7. The image determination apparatus according to claim 2, wherein the correction unit corrects the likelihood in accordance with a degree to which a shape represented by a combination of a plurality of intersecting linear components included in the first set or the second set is similar to a predetermined shape.

8. The image determination apparatus according to claim 2, wherein the correction unit corrects the likelihood in accordance with a ratio of the number of ends of linear components included in the second set, each linear component having a first end intersecting an end of a linear component in the first direction and a second end intersecting an end of a linear component in the second direction, to the number of intersections of linear components included in the first set and linear components included in the second set.

9. The image determination apparatus according to claim 2, wherein a linear component has a first end intersecting a linear component in the first direction and a second end intersecting a linear component in the second direction, and the correction unit corrects the likelihood in accordance with a distance between an intersection of the linear component having the first end and the second end and the linear component in the first direction, and an intersection of a linear component included in the first set and a linear component included in the second set, and in accordance with a distance between an intersection of the linear component having the first end and the second end and the linear component in the second direction, and an intersection of a linear component included in the first set and the linear component included in the second set.

10. The image determination apparatus according to claim 2, wherein the correction unit does not correct the likelihood using the relationship between the first set and the second set when the relationship between the first set and the second set satisfies a predetermined condition.

11. The image determination apparatus according to claim 10, wherein the predetermined condition includes a condition that a linear component included in the second set corresponds to a diagonal of a parallelogram formed by linear components that are included in the first set and that intersect the linear component included in the second set.

12. The image determination apparatus according to claim 10, wherein the predetermined condition includes a condition that a shape represented by a combination of a plurality of intersecting linear components included in the first set or the second set corresponds to a predetermined shape.

13. The image determination apparatus according to claim 10, wherein the predetermined condition includes a condition that a linear component included in the second set corresponds to a linear component having a first end intersecting a linear component in the first direction and a second end intersecting a linear component in the second direction.

14. The image determination apparatus according to claim 1, wherein the correction unit corrects the likelihood in accordance with a difference in line type between a linear component included in the first set and a linear component included in the second set.

15. The image determination apparatus according to claim 1, wherein when a degree of change in thickness of a linear component included in the second set exceeds a threshold value, the correction unit does not correct the likelihood using the linear component included in the second set.

16. The image determination apparatus according to claim 1, further comprising a third extraction unit that extracts a third set including an aggregate component from the image, the aggregate component being a non-linear aggregated component,
wherein the correction unit corrects the likelihood in accordance with a length or shape of a portion where a parallelogram formed by linear components included in the first set comes in contact with an aggregate component that is included in the third set and that is located in the parallelogram.

17. The image determination apparatus according to claim 16, wherein when the shape of the portion where a parallelogram formed by linear components included in the first set comes in contact with an aggregate component that is included in the third set and that is located in the parallelogram corresponds to a shape of the parallelogram, the correction unit does not correct the likelihood using the parallelogram and the aggregate component.

18. A non-transitory computer readable medium storing a program causing a computer to execute a process, the process comprising:
extracting a first set from an image including linear components that are line-shaped components, the first set including a linear component extending along a first direction and a linear component extending along a second direction intersecting the first direction;
extracting a second set including a linear component extending along a direction different from the first direction and the second direction;
calculating a likelihood of the extracted first set forming a table; and
correcting the calculated likelihood in accordance with a relationship between the first set and the second set.

19. A method comprising:
extracting a first set from an image including linear components that are line-shaped components, the first set including a linear component extending along a first direction and a linear component extending along a second direction intersecting the first direction;
extracting a second set including a linear component extending along a direction different from the first direction and the second direction;
calculating a likelihood of the extracted first set forming a table in accordance with a relationship between linear components included in the first set; and correcting the calculated likelihood in accordance with a relationship between the first set and the second set, wherein at least one of the preceding steps is performed using a processor.

* * * * *